US012226999B2

(12) United States Patent
Yuasa

(10) Patent No.: US 12,226,999 B2
(45) Date of Patent: Feb. 18, 2025

(54) IMAGE FORMING APPARATUS AND IMAGE FORMING METHOD

(71) Applicant: Konica Minolta, Inc., Tokyo (JP)

(72) Inventor: Kei Yuasa, Sagamihara (JP)

(73) Assignee: KONICA MINOLTA, INC., Tokyo (JP)

( * ) Notice: Subject to any disclaimer, the term of this patent is extended or adjusted under 35 U.S.C. 154(b) by 104 days.

(21) Appl. No.: 17/934,335

(22) Filed: Sep. 22, 2022

(65) Prior Publication Data

US 2023/0114018 A1 Apr. 13, 2023

(30) Foreign Application Priority Data

Oct. 11, 2021 (JP) ................................. 2021-166577

(51) Int. Cl.

*B41J 11/00* (2006.01)
*G03G 15/16* (2006.01)
*G03G 15/00* (2006.01)

(52) U.S. Cl.

CPC ...... *B41J 11/0005* (2013.01); *G03G 15/1695* (2013.01); *G03G 15/6558* (2013.01)

(58) Field of Classification Search

CPC ............. B41J 11/0005; G03G 15/1695; G03G 15/6558

See application file for complete search history.

(56) References Cited

U.S. PATENT DOCUMENTS 5,144,385 A * 9/1992 Tani ........................ B65H 29/20 399/406
2007/0009275 A1* 1/2007 Yokoyama ........... B41J 11/0095 399/69
2007/0146457 A1* 6/2007 Kito ..................... B41J 11/0035 347/101
2014/0085371 A1* 3/2014 Ebisawa ............. B41J 2/04501 347/14
2020/0249597 A1* 8/2020 Tadomi .............. G03G 15/2039

FOREIGN PATENT DOCUMENTS

JP 2000-010423 A 1/2000
JP 2002029110 A * 1/2002 ............ B41J 3/4078
JP 2003291332 A * 10/2003 .......... B41J 11/0005

* cited by examiner

*Primary Examiner* — Yaovi M Ameh

(74) *Attorney, Agent, or Firm* — BakerHostetler

(57) ABSTRACT

An image forming apparatus includes an image former and a flattener. The image former forms an image on a recording medium. The flattener is disposed upstream of the image former in a conveying direction of the recording medium, and flattens the recording medium before the image former forms the image on the recording medium.

8 Claims, 6 Drawing Sheets

IMAGE FORMING APPARATUS AND IMAGE FORMING METHOD

CROSS-REFERENCE TO RELATED APPLICATIONS

This application claims priority to Japanese Patent Application No. 2021-166577 filed on Oct. 11, 2021, the entire disclosure of which is incorporated herein by reference.

BACKGROUND

Technical Field

The present disclosure relates to an image forming apparatus and an image forming method.

Description of the Related Art

As a recording medium that is used in an image forming apparatus, other than general paper made of paper only, there is, what is called, label paper (or tack paper), which contains glue (adhesive) for pasting. Glue used in label paper may have unevenness in its amount (thickness) in the label paper depending on the type of the glue. If an electrophotographic image forming apparatus uses label paper having glue unevenness, it may generate density unevenness of an image when toner images are transferred to the label paper owing to resistance unevenness (unevenness in electrical resistance) of the label paper generated by being influenced by the glue.

For example, in JP 2000-10423 A, there is disclosed a technique for reducing density unevenness of an image formed on paper by making notches in the circumferential direction of a transfer roller at several points in the longer direction thereof to increase a surface resistance value in the axial direction and eliminate a sneak path(s) of current.

SUMMARY

Although the technique disclosed in JP 2000-10423 A can prevent current from escaping to outside of paper due to the paper being small, it has little effect on resistance unevenness in paper and may cause density unevenness in an image formed on the paper.

Objects of the present disclosure include suppressing density unevenness of an image(s) formed on a recording medium even if there is resistance unevenness in the recording medium.

In order to achieve at least one of the objects, according to an aspect of the present disclosure, there is provided an image forming apparatus including:

- an image former that forms an image on a recording medium; and
- a flattener that is disposed upstream of the image former in a conveying direction of the recording medium, and flattens the recording medium before the image former forms the image on the recording medium.

In order to achieve at least one of the objects, according to another aspect of the present disclosure, there is provided an image forming method including:

- forming an image on a recording medium; and
- flattening the recording medium before forming the image on the recording medium.

BRIEF DESCRIPTION OF THE DRAWINGS

The advantages and features provided by one or more embodiments of the present disclosure will become more fully understood from the detailed description given hereinbelow and the appended drawings that are given by way of illustration only, and thus are not intended as a definition of the limits of the present disclosure, wherein.

DETAILED DESCRIPTION OF EMBODIMENTS

Hereinafter, one or more embodiments of the present disclosure will be described with reference to the drawings. However, the scope of the present disclosure is not limited to these embodiments or illustrated examples.

First Embodiment

[Configuration of Image Forming Apparatus 100]

Figure 1:
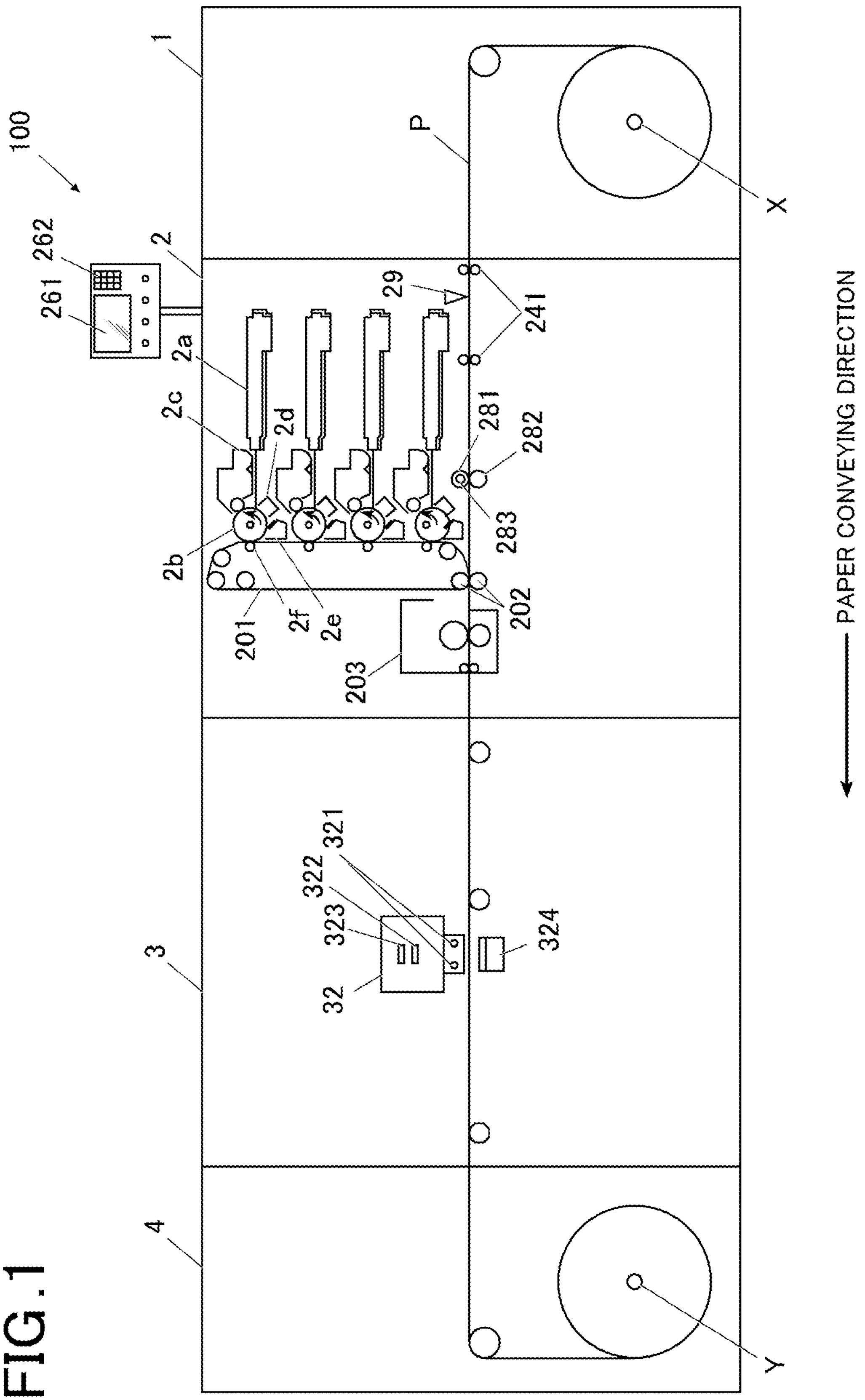
FIG. 1 schematically shows the configuration of an image forming apparatus.
Figure 2:
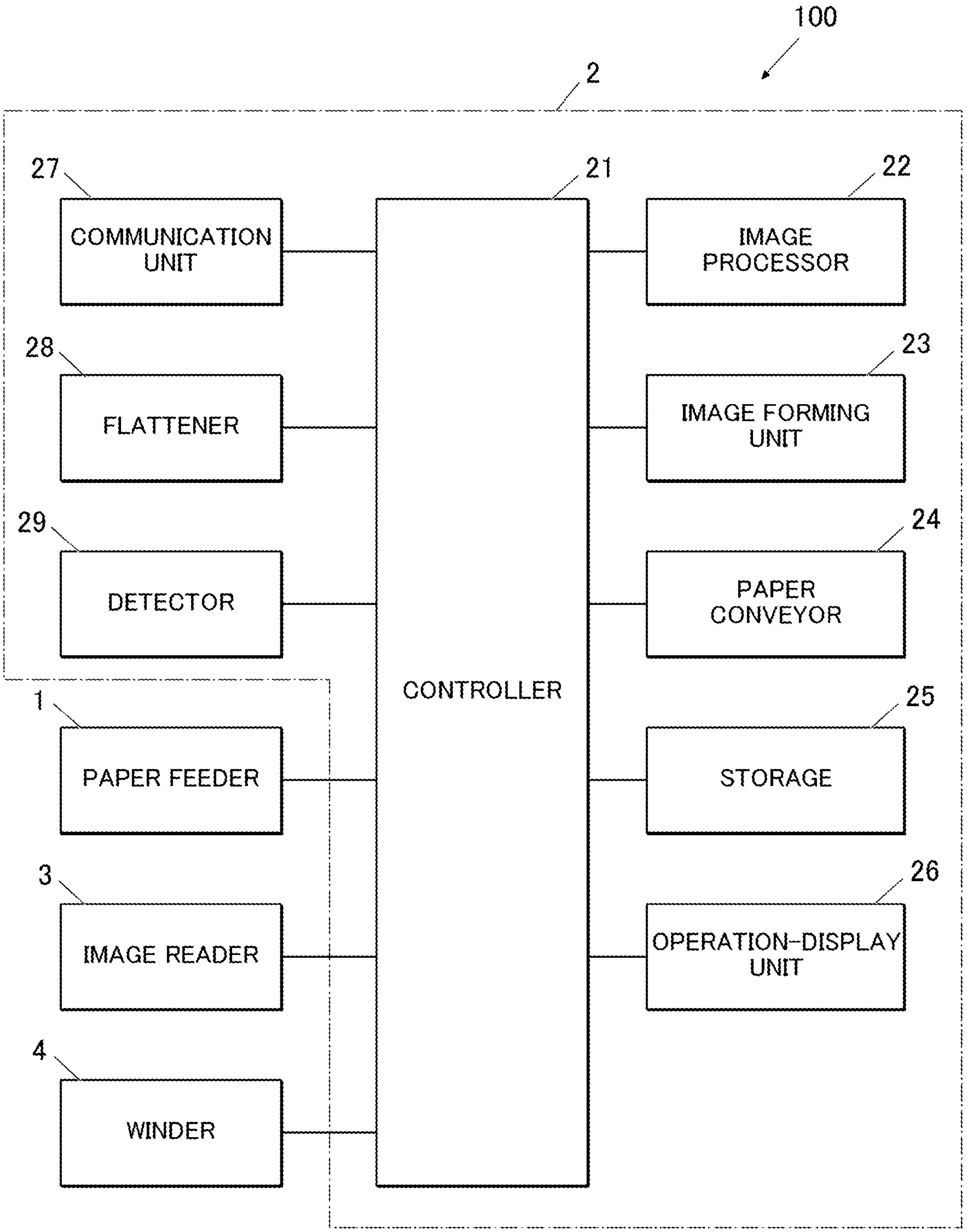
FIG. 2 is a block diagram showing the main functional configuration of the image forming apparatus.

FIG. 1 shows an example of the overall configuration of an image forming apparatus 100 according to an embodiment(s) of the present disclosure, viewed from the front. FIG. 2 shows the main part of a control system of the image forming apparatus 100. The image forming apparatus 100 is an apparatus that forms images on a roll of a recording medium (rolled recording medium). In this embodiment, a case where an image(s) is formed on a roll of label paper P (rolled label paper P) will be described as an example.

As shown in FIG. 1, the image forming apparatus 100 is configured such that a paper feeder 1, a main body 2, an image reader 3 and a winder 4 are arranged in this order from the upstream along a paper passing direction of the label paper P (paper conveying direction) and connected.

The paper feeder 1 is a device that feeds the label paper P to the main body 2. The paper feeder 1 conveys the label paper P wound around a support shaft X to the main body 2 via pairs of conveyance rollers pairs, such as unwinding rollers and feeding rollers, at a constant speed. The feeding operation of the paper feeder 1 is controlled by a controller 21 (hardware processor) included in the main body 2.

The main body 2 forms images with an intermediate transfer system using an electrophotographic process technique.

As shown in FIG. 2, the main body 2 includes the aforementioned controller 21, an image processor 22, an image forming unit 23, a paper conveyor 24, a storage 25, an operation-display unit 26, a communication unit 27, a flattener 28 and a detector 29. These components are connected to one another by a bus.

The controller 21 includes a CPU (Central Processing Unit), a ROM (Read Only Memory) and a RAM (Random Access Memory). The CPU of the controller 21 reads a program from the ROM corresponding to contents of a process, loads the read program to the RAM, and performs centralized control of operation of each component of the main body 2 and operation of each of the paper feeder 1, the image reader 3, the winder 4 and the like by working together with the loaded program. In this embodiment, the controller 21 functions as a determining unit and a control unit. Further, the controller 21 functions as an obtaining unit by working together with the image reader 3.

The image processor 22 performs image processing, such as density correction, rasterization, color conversion and/or halftone processing, on image data of jobs input thereto via the communication unit 27 or the like, and outputs the processed image data to the image forming unit 23.

The image forming unit 23 includes four sets of an exposing unit 2*a*, a photoreceptor 2*b*, a developing unit 2*c*, a charger 2*d*, a cleaner 2*e* and a first transfer roller 2*f* for color components of Y (yellow), M (magenta), C (cyan) and K (black), an intermediate transfer body 201, a pair of second transfer rollers 202 and a fixing unit 203. In the image forming unit 23, on the basis of input image data, toner images of four colors are formed on their respective photoreceptors 2*b* and first-transferred to the intermediate transfer body 201 in order so as to be superimposed on top of one another, and an image generated thereby is second-transferred by the second transfer rollers 202 to the label paper P fed from the paper feeder 1, thereby being formed on the label paper P. The formed image is then fixed to the label paper P by the fixing unit 203.

The paper conveyor 24 includes conveyance rollers 241 and their drive source(s), and conveys the label paper P conveyed from the paper feeder 1.

The storage 25 includes a nonvolatile semiconductor memory (so-called flash memory), a hard disk drive and/or the like. The storage 25 stores various programs that are executed by the controller 21, parameters necessary for execution of processes corresponding to the programs, such as reference control values (temperature, pressure, etc. of the flattener 28), and data of process results and so forth. The storage 25 also stores, for example, input job information (image data of jobs, setting information on jobs, etc.). The storage 25 also stores a flattening flag indicating whether it is necessary to flatten the label paper P. These data and so forth may be stored in the RAM of the controller 21.

The operation-display unit 26 is constituted of, for example, a liquid crystal display (LCD) provided with a touchscreen, and functions as a display 261 and an operation unit 262.

The display 261 displays various operation screens, image states, operation statuses of functions and so forth in accordance with display control signals input from the controller 21.

The operation unit 262 includes a numeric keypad and various operation keys, such as a start key, and receives various input operations made by a user and outputs operation signals corresponding thereto to the controller 21. In this embodiment, the operation unit 262 functions as an adjuster.

The communication unit 27 is, for example, constituted of a communication control card, such as a LAN (Local Area Network) card, and sends and receives various data to and from external apparatuses (e.g., personal computer) connected to a communication network, such as a LAN or a WAN (Wide Area Network).

The flattener 28 is disposed upstream of the second transfer rollers 202 in the paper conveying direction, the second transfer rollers 202 being an image former(s) that forms (transfers) images to the label paper P. The flattener 28 flattens the label paper P by applying heat and pressure to (heating and pressurizing) the label paper P before the label paper P enters the second transfer rollers 202 (image former).

Figure 3:
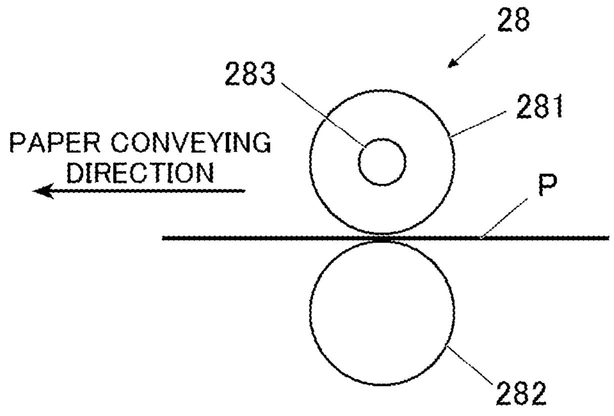
FIG. 3 schematically shows a flattener viewed from the front of the image forming apparatus.
Figure 4:
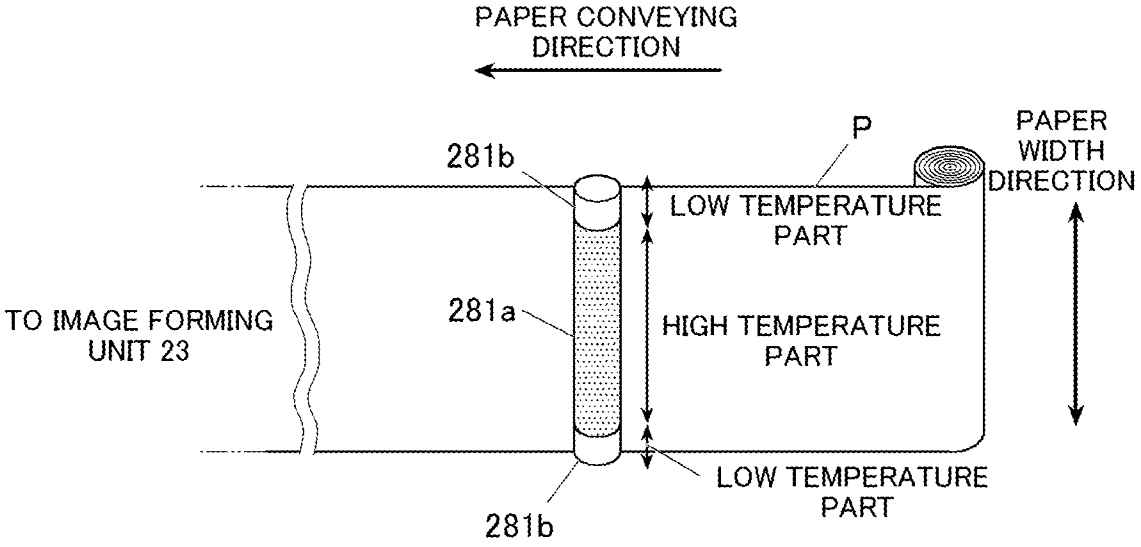
FIG. 4 schematically shows a heating roller of the flattener viewed from the above.

FIG. 3 schematically shows the flattener 28 viewed from the front of the image forming apparatus 100. FIG. 4 schematically shows a heating roller 281 of the flattener 28 viewed from the above. As shown in FIG. 3, the flattener 28 includes: the heating roller 281 provided with a heating source 283; and a counter roller 282 that faces (is opposite) the heating roller 281. The heating roller 281 and the counter roller 282 are long in a paper width direction (direction perpendicular to the paper conveying direction) of the label paper P. The heating roller 281 and the counter roller 282 can be rotated by a not-shown motor(s) or the like, and, together with the paper conveyor 24, convey the label paper P in the paper conveying direction. Further, the heating roller 281 and the counter roller 282 can be pressed against one another and separated from one another by drive of a not-shown pressing drive mechanism. The heated heating roller 281 and the counter roller 282 being pressed against one another can flatten the thickness of glue of the label paper P when the label paper P passes through between the rollers.

Figure 5:
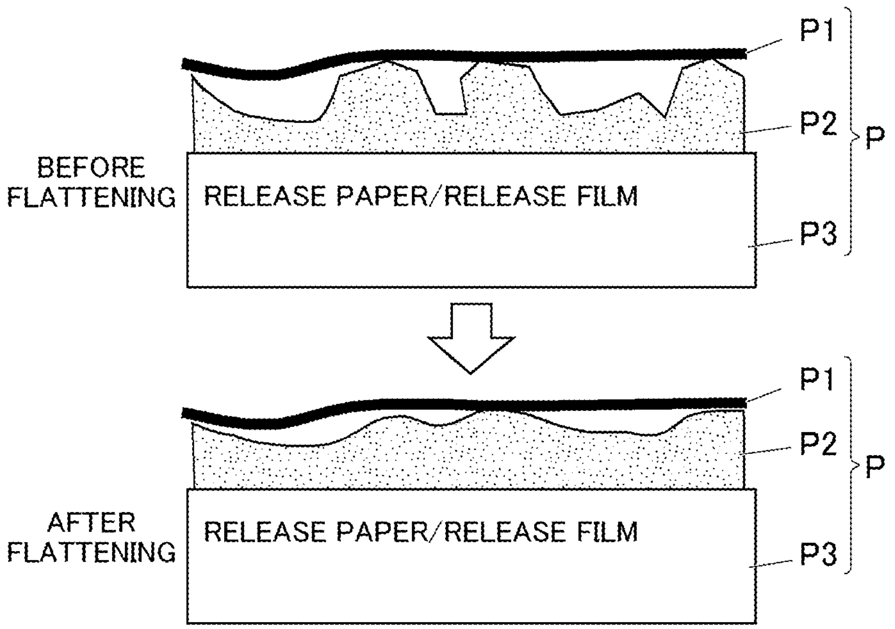
FIG. 5 schematically shows sections of label paper before and after the flattener flattens the label paper.

FIG. 5 schematically shows sections of the label paper P before and after the flattener 28 flattens the label paper P. As shown in FIG. 5, in the label paper P, glue P2 is applied to between release paper/release film P3 and a surface base material P1. The glue P2 varies in thickness, but, as shown in FIG. 5, the thickness of the glue P2 can be flattened by the flattener 28 applying heat and pressure thereto.

As shown in FIG. 4, the heating roller 281 has a center part 281*a* as a high temperature part and, outside the center part 281*a*, two end parts 281*b* as low temperature parts, in the longer direction of the heating roller 281. The high temperature part (center part 281*a*) has a length corresponding to a printable region of the label paper P (a region, on the label paper P, where the image forming unit 23 can form (print) an image(s)), and is a region heated at a high temperature (e.g., 150° C.) in order to flatten the label paper P. The low temperature parts (end parts 281*b*) are low temperature (e.g., room temperature) regions, and are regions provided at both ends of the heating roller 281 in the longer direction in order to prevent the glue P2 from being out of the label paper P by being heated and from adhering to the roller. Although it is preferable that the end parts 281*b* be provided in order to prevent the glue P2 from being out of the label paper P, the label paper P can be flattened without the end parts 281*b*.

Values (reference control values) of temperature and pressure that are applied to the label paper P in the flattener 28 can be adjusted by the user or service personnel making operations on the operation-display unit 26 or through the communication unit 27. These control values can be adjusted separately for the center part 281*a* and the end parts 281*b* of the heating roller 281. Both the temperature and the pressure may be adjustable, or only one of them may be adjustable.

For example, if thick label paper P is used, increasing the temperature (temperature setting) or the pressure of the center part 281*a* can sufficiently flatten the label paper P and suppress density unevenness of an image. If a large amount of the glue P2 flows out (is pressed out) from the end parts of the label paper P, decreasing the temperature or the pressure of the end parts 281*b* can suppress the flowing-out of the glue P2. If the end parts 281*b* correspond to part of the printable region, and suppression of the density unevenness of an image in regions of the label paper P corresponding to the end parts 281*b* is insufficient, increasing the temperature or the pressure of the end parts 281*b* to the same level as that of the center part 281*a* can suppress the density unevenness of the image in the end parts (regions) of the label paper P. Both the temperature and the pressure may be adjusted.

The detector 29 is a detector that is disposed upstream of the flattener 28 in the paper conveying direction, and detects unevenness in thickness of the glue P2 of the label paper P and outputs the result to the controller 21 before the flattener 28 performs a flattening process.

Figure 6:
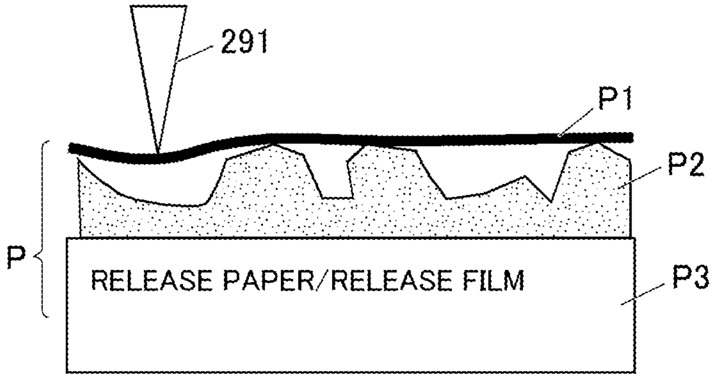
FIG. 6 is an illustration to explain a detector.

For example, as shown in FIG. 6, the detector 29 includes a detection needle 291 (contacting member) that contacts and presses the surface of the label paper P when the label paper P passes thereunder, and detects unevenness in thickness of the glue P2 by detecting an asperity(ies) on the surface of the label paper P on the basis of the height (height position) of the detection needle 291 when the label paper P passes under the detection needle 291. If the thickness of the glue P2 is uniform (has no unevenness), the surface of the label paper P is uniform, whereas if the thickness of the glue P2 is not uniform (has unevenness), the surface of the label paper P is not uniform. Since the detector 29 detects unevenness in thickness of the label paper P, the detector 29 picks up not only unevenness in thickness of the glue P2 but also unevenness in thickness of each of the surface base material P1 and the release paper P3. However, these become, like the glue unevenness, resistance unevenness, and hence there is no problem.

Figure 7:
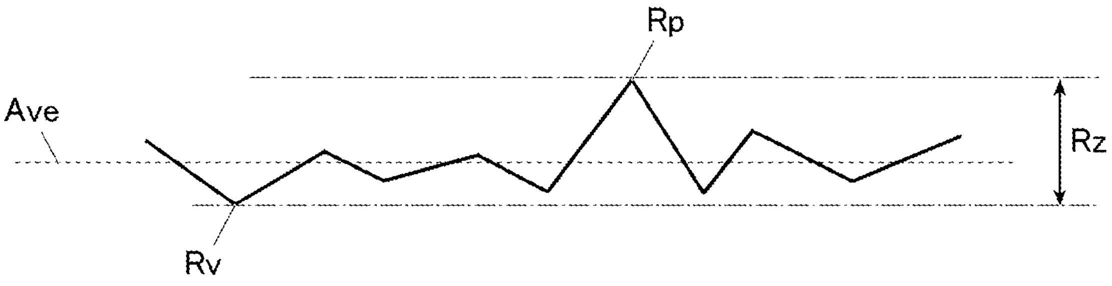
FIG. 7 shows an example of a graph showing change in paper height detected by a detection needle while label paper is running a predetermined distance.

FIG. 7 shows an example of a graph showing change in paper height detected by the detection needle 291 while the label paper P is running a predetermined distance (e.g., 8 mm). As shown in FIG. 7, the detector 291 calculates a value Rz obtained by adding up a distance (difference) from a value of the average height Ave of the detected paper height to a value of the highest peak Rp and a distance (difference) from the value of the average height Ave to a value of the lowest peak Rv, and outputs the calculated Rz to the controller 21.

The detection needle 291 can avoid a situation where it damages the label paper P, by being disposed so as to contact outside of the printable region (outside of an image region) on the label paper P, or by a conveyance speed of the label paper P being reduced. Instead of the detection needle 291, a contacting member such as a roller may be used as the detector 29.

The image reader 3 reads the label paper P with the image formed by the main body 2 to obtain a read image. The image reader 3 includes light sources 321, a lens 322, a CCD (Charge Coupled Device) line sensor 323 and a background member 324, and optically scans the label paper P conveyed from the main body 2 to generate a read image by forming, with the lens 322, an image of light reflected by the label paper P on a light-receiving surface of the CCD line sensor 323 and performing photoelectric conversion, and outputs the generated read image to the controller 21.

The winder 4 winds up, at a constant speed, the label paper P around a support shaft Y conveyed from the image reader 3 via pairs of conveyance rollers, such as ejecting rollers and winding rollers. The winding-up operation of the winder 4 is controlled by the controller 21 included in the main body 2.

[Operation of Image Forming Apparatus 100]

Next, operation related to a process of flattening the label paper P (flattening process) in the image forming apparatus 100 will be described.

(Flattening Necessity Determination Process)

When a predetermined timing arrives, the controller 21 of the image forming apparatus 100 performs a flattening necessity determination process with the abovementioned detector 29. For example, the controller 21 performs the flattening necessity determination process when a roll of label paper P is replaced with another or when it is instructed to perform a job. The timing at which the flattening necessity determination process is performed can be set by the user with the operation-display unit 26 or the like.

In the flattening necessity determination process, the controller 21 causes the detection needle 291 to contact the label paper P while causing the paper conveyor 24 to convey the label paper P, and causes the detection needle 291 to detect the height (height position) of the label paper P while the label paper P is moving a predetermined distance (e.g., about 8 mm) in the paper conveying direction, and obtain Rz. If Rz is equal to or greater than a predetermined threshold value (e.g., 3 μm), the controller 21 determines that flattening is necessary and sets the flattening flag in the storage 25 to ON. If Rz is less than the predetermined threshold value, the controller 21 determines that flattening is unnecessary and sets the flattening flag in the storage 25 to OFF.

(Printing Control Process)

Figure 8:
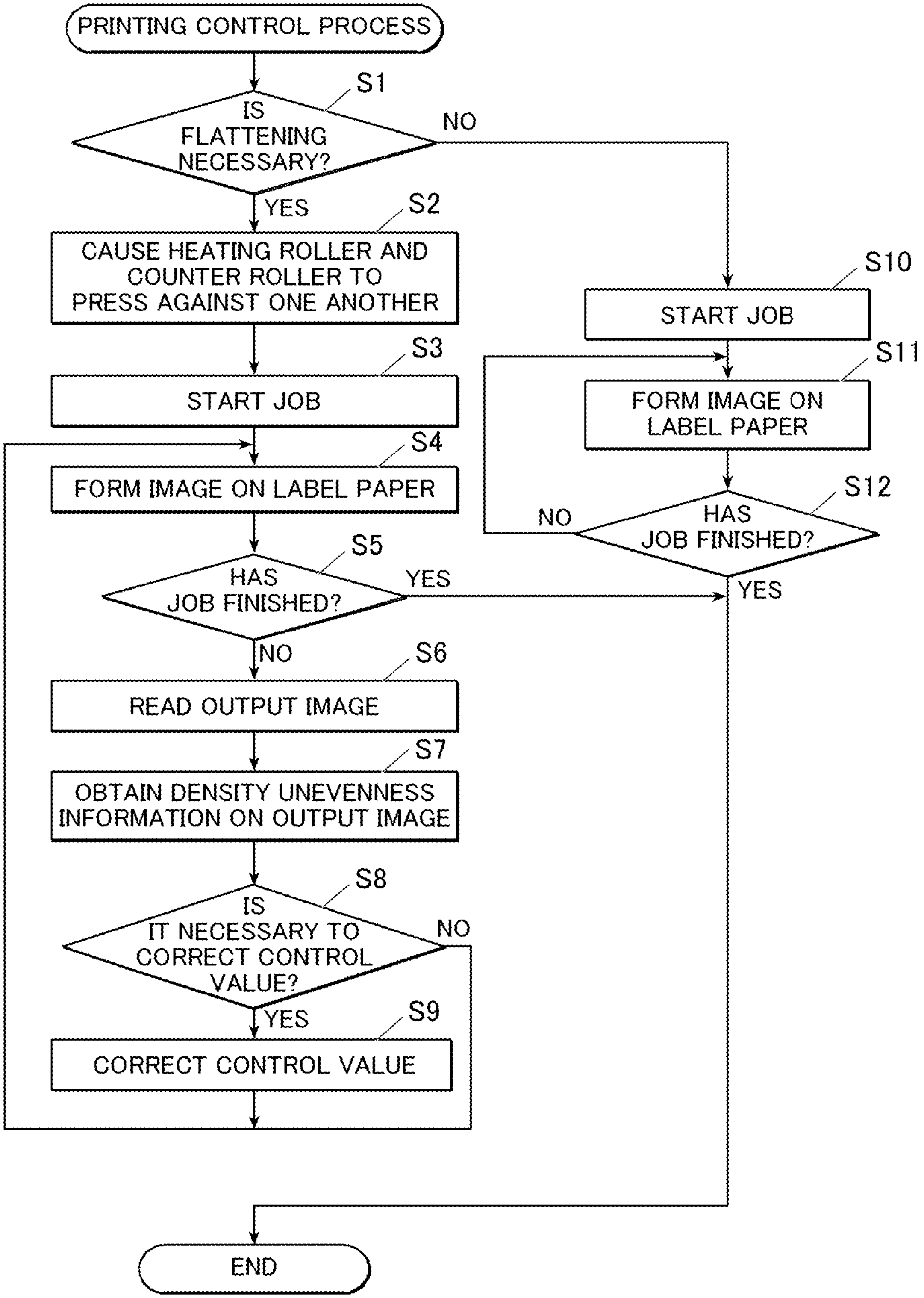
FIG. 8 is a flowchart of a printing control process that is performed by a controller shown in FIG. 2.

When the controller 21 is instructed to perform a job by receiving job information from the communication unit 27, the controller 21 performs a printing control process shown in FIG. 8. If the flattening necessity determination process is set so as to be performed when an instruction to perform a job is received, the controller 21 performs the printing control process after performing the flattening necessity determination process. The printing control process is performed by the CPU of the controller 21 working together with a program(s) stored in the ROM of the controller 21. Hereinafter, the printing control process will be described with reference to FIG. 8.

First, the controller 21 refers to the flattening flag stored in the storage 25 to determine whether flattening is necessary (Step S1).

If the flattening flag is ON, the controller 21 determines that flattening is necessary, whereas if the flattening flag is OFF, the controller 21 determines that flattening is unnecessary.

If the controller 21 determines that flattening is necessary (Step S1; YES), the controller 21 causes, on the basis of the reference control values, the heating roller 281 heated by the heating source 283 and the counter roller 282 to press against one another (Step S2). This can flatten the thickness of the glue P2 of the label paper P before the label paper P enters the second transfer rollers 202 (before an image is formed on the label paper P).

Next, the controller 21 starts a job (Step S3), and causes the paper conveyor 24 to convey the label paper P at a predetermined speed and causes the image forming unit 23 to form an image based on image data of the job on the label paper P (Step S4).

Next, the controller 21 determines whether the job has finished (Step S5). That is, the controller 21 determines whether an image based on the last image data of the job has been formed.

If the controller 21 determines that the job has not finished (Step S5; NO), the controller 21 causes the image reader 3 to read the label paper P with the image formed, thereby obtaining a read image of the image (output image) formed on the label paper P (Step S6).

The read image obtained by the image reader 3 may include not only the region of the image but also the region of the label paper P.

Next, the controller 21 obtains density unevenness information on the output image on the basis of comparison between the obtained read image and the image data of the job (Step S7), and determines, on the basis of the obtained density unevenness information, whether it is necessary to correct the control values used in the flattener 28 (Step S8).

For example, the controller 21 identifies, in the image data of the job, a region to be printed in a solid color, and obtains color difference in the identified region in the read image (e.g., $\Delta E_{00}$ of CIEDE2000) as the density unevenness information. Then, if the density unevenness information is equal to or greater than a predetermined first threshold value, for example, if $\Delta E_{00}$ is equal to or greater than 6, the controller 21 determines that it is necessary to correct the control value(s) to use to a value(s) 10% greater than the reference control value(s) stored in the storage 25. If the control value(s) to use is/are already set to the value(s) 10% greater than the reference control value(s), the controller 21 determines that it is unnecessary to correct the control value(s). If the density unevenness information is equal to or greater than a predetermined second threshold value but less than the predetermined first threshold value, for example, if $\Delta E_{00}$ is equal to or greater than 3 but less than 6, the controller 21 determines that it is necessary to correct the control value(s) to use to the reference control value(s) stored in the storage 25. If the control value(s) to use is/are already set to the reference control value(s), the controller 21 determines that it is unnecessary to correct the control value(s). If the density unevenness information is less than the predetermined second threshold value, for example, if $\Delta E_{00}$ is less than 3, the controller 21 determines that it is necessary to correct the control value(s) to use to a value(s) 10% less than the reference control value(s) stored in the storage 25. If the control value(s) to use is/are already set to the value(s) 10% less than the reference control value(s), the controller 21 determines that it is unnecessary to correct the control value(s). The first threshold value is greater than the second threshold value.

If the controller 21 determines that it is necessary to correct the control value(s) of the flattener 28 (Step S8; YES), the controller 21 corrects the control value(s) (e.g., temperature and pressure) used in the flattener 28 (Step S9) and returns to Step S4.

If the controller 21 determines that it is unnecessary to correct the control values of the flattener 28 (Step S8; NO), the controller 21 returns to Step S4.

The image forming unit 23 forms an image(s) on the label paper P conveyed thereto even during Steps S6 to S9. The image reader 3 reads the image(s) formed on the label paper P conveyed thereto even during Steps S4 to S5 and Steps S7 to S8. The controller 21 performs Steps S7 to S9 when receiving the read image(s) from the image reader 3, even during Steps S4 to S6.

In Step S5, if the controller 21 determines that the job has finished (Step S5; YES), the controller 21 ends the printing control process.

In Step S1, if the controller 21 determines that flattening is unnecessary (Step S1; NO), the controller 21 starts a job (Step S10), and causes the paper conveyor 24 to convey the label paper P at a predetermined speed and causes the image forming unit 23 to form an image based on image data of the job on the label paper P (Step S11). Until the controller 21 determines that the job has finished (Step S12; NO), the controller 21 repeats Step S11. If the controller 21 determines that the job has finished (Step S12; YES), the controller 21 ends the printing control process.

After ending the printing control process, the controller 21 determines whether the heating roller 281 and the counter roller 282 press against one another. If the controller 21 determines that they press against one another, the controller 21 separates them from one another.

(Verification of Flattening Process)

A verification experiment was conducted to verify the effects in the above embodiment.

Figure 9:
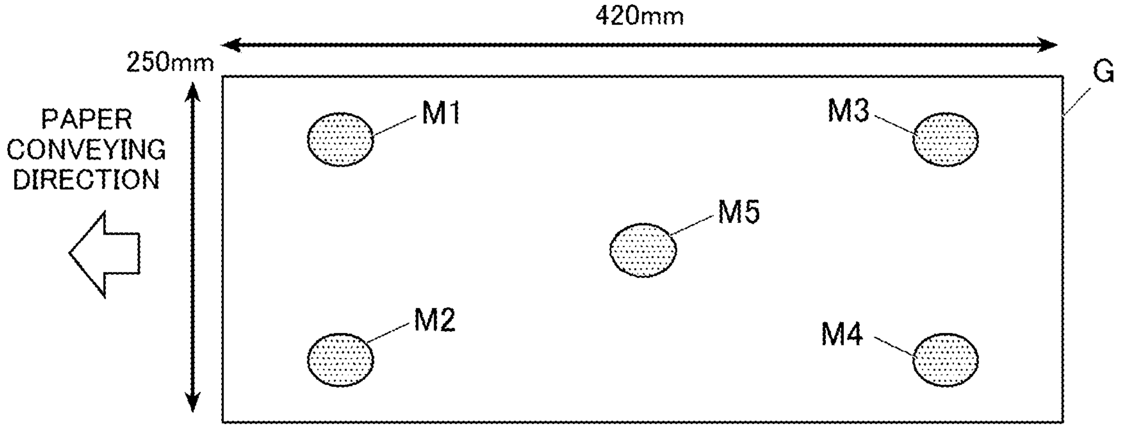
FIG. 9 shows an image formed on label paper and measurement points of density unevenness in a verification experiment of a flattening process.

As a heating roller and a counter roller, rollers made of silicon rubber were used. The heating roller was 150° C. at a 240 mm center part and room temperature at both 40 mm end parts. Label paper used was 35 μm thick. In the experiment, the heating roller and the counter roller were brought into contact with the label paper such that the total pressure became 2,000 N, and thereafter a solid image G having a width of 250 mm and a length of 420 mm as shown in FIG. 9 was formed on the label paper, average densities of four points (M1 to M4) at the end parts and a point (M5) at the center part were measured, and the maximum difference of the measured average densities was calculated by $\Delta E_{00}$ determined by CIEDE2000. Further, as a comparative example, the same image was formed on the label paper with no flattening process performed, the same measurement was performed, and $\Delta E_{00}$ was calculated. As a result, $\Delta E_{00}$ was 6.0 in the case where the flattening process was not performed, whereas $\Delta E_{00}$ was 4.0 in the case where the flattening process was performed.

Thus, it was verified that the flattening process on the label paper P before image forming suppressed the density unevenness.

Second Embodiment

Next, a second embodiment of the present disclosure will be described.

In the first embodiment, as the detector that detects unevenness in thickness of the glue P2 of the label paper P, the detection needle 291, which detects the asperity on the surface of the label paper P by contacting the label paper P, is used, but in the second embodiment, unevenness in thickness of the glue P2 of the label paper P is detected by a component not contacting the label paper P.

The second embodiment is the same as the first embodiment in configuration, except for the detector 29. Hence, hereinafter, the configuration of the detector 29 (referred to as "detector 29A") in the second embodiment will be described, and regarding the other components, descriptions in the first embodiment will be employed.

Figure 10:
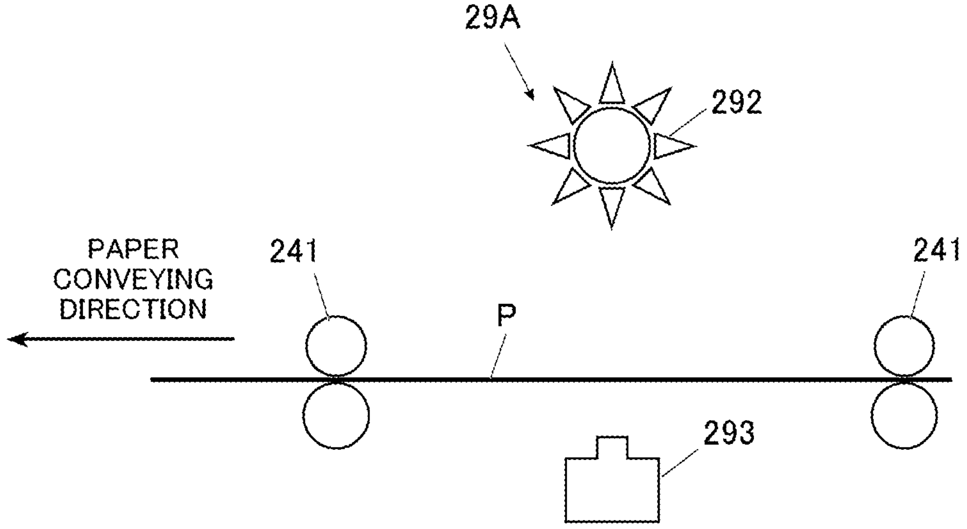
FIG. 10 shows a configuration example of a detector of a second embodiment.
Figure 11:
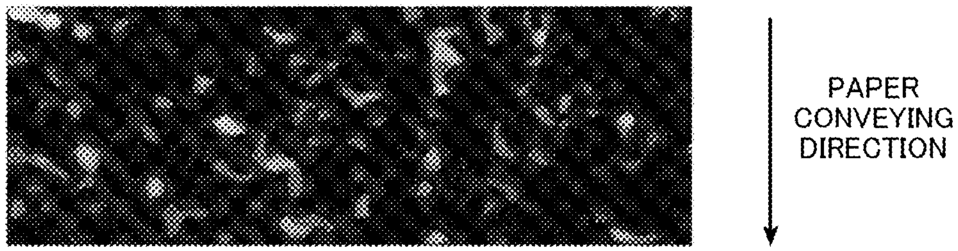
FIG. 11 shows an example of an image captured by the detector of the second embodiment.

FIG. 10 shows a configuration example of the detector 29A. As shown in FIG. 10, the detector 29A includes a light source 292 and an imager 293 (CCD sensor, etc.) that are disposed with a paper conveyance path in between. The light source 292 emits light (e.g., strong light of about 15,000 lux) to the label paper P, and the imager 293 images transmission light of the light source 292 having passing through the label paper P, thereby obtaining a captured image. In this captured image, as shown in FIG. 11, thick parts of the label paper P appear in black, and thin parts thereof appear in white. That is, the detector 29A can obtain in-plane thickness unevenness of the label paper P, namely, unevenness of the glue P2, as a grayscale image.

In the flattening necessity determination process in the second embodiment, the controller 21 causes the light source 292 to emit light to the label paper P, and causes the imager 293 to obtain a captured image of the label paper P. Then, the controller 21 converts the captured image into a grayscale image. If the difference between the maximum gradation value (gray level) and the minimum gradation value (gray level) (gradation difference) in the captured image is equal to or greater than a predetermined threshold value (e.g., 200), the controller 21 determines that flattening is necessary and sets the flattening flag in the storage 25 to ON. If the difference in the gradation difference is less than the predetermined threshold value, the controller 21 determines that flattening is unnecessary and sets the flattening flag in the storage 25 to OFF.

The printing control process in the second embodiment is the same as that in the first embodiment, and hence the description in the first embodiment will be employed.

Thus, in the second embodiment, it is possible to determine whether to perform the flattening process, in a non-contact manner.

As described above, the image forming apparatus 100 includes: the image forming unit 23 that forms an image on the label paper P; and the flattener 28 that is disposed upstream of the second transfer rollers 202 of the image forming unit 23 in the conveying direction of the label paper P and includes the heating roller 281 and the counter roller 282. Before the image forming unit 23 forms an image on the label paper P, the flattener 28 flattens the label paper P.

This can suppress the density unevenness of an image formed on the label paper P even if there is resistance unevenness in the label paper P.

Further, the operation-display unit 26 or the like is capable of adjusting the temperature and/or the pressure that the flattener 28 applies to the label paper P. This can suppress the density unevenness more precisely.

Further, the operation-display unit 26 or the like is capable of adjusting the temperature and/or the pressure that the flattener 28 applies to the label paper P separately for the center part 281*a* and for the two end parts 281*b* of the heating roller 281. This can suppress the density unevenness more precisely.

Further, the detector 29 (or 29A) that detects unevenness in thickness of the label paper P is provided, and the controller 21 determines based on the result of the detection by the detector 29 whether to flatten the label paper P with the flattener 28. This can flatten the label paper P only when there is unevenness in thickness of the label paper P, thereby suppressing wear and tear of the flattener 28.

Further, the controller 21 obtains the density unevenness information on the image formed on the label paper P, and corrects the control value(s) of the flattener 28 based on the obtained density unevenness information. This can suppress the density unevenness more precisely.

The above embodiments are not limitations but some of preferred examples of the present disclosure.

For example, in the above embodiments, the density unevenness of an output image is suppressed by flattening the thickness of the glue P2 of the label paper P. However, even if a recording medium other than the label paper P is used, the resistance unevenness in the recording medium can be suppressed by the flattener 28 flattening the recording medium (thickness of the recording medium) before printing is performed. Hence, in this case too, the density unevenness of an output image can be suppressed.

Further, in the above embodiments, a rolled recording medium is used, but even if the present disclosure is applied to cut paper, such as sheets of paper, the same effects can be obtained.

Further, in the above embodiments, the image reader 3 is used to obtain the density unevenness information on the image formed on a recording medium, but a colorimeter may be used.

Besides, detailed configurations/components and detailed operation(s) of the image forming apparatus can be appropriately modified without departing from the scope of the present disclosure.

Although one or more embodiments of the present invention have been described and illustrated in detail, the disclosed embodiments are made for purposes of not limitation but illustration and example only. The scope of the present invention should be interpreted by terms of the appended claims.

What is claimed is:

1. An image forming apparatus comprising:

an image former that forms an image on a recording medium, wherein the recording medium includes glue for pasting;

a flattener that is disposed upstream of the image former in a conveying direction of the recording medium, and flattens the recording medium and an unevenness of the glue included in the recording medium before the image former forms the image on the recording medium; and an adjuster that adjusts a temperature, a pressure, or both the temperature and the pressure that the flattener applies to the recording medium and the unevenness of the glue included in the recording medium;

wherein the flattener flattens the recording medium and the unevenness of the glue included in the recording medium by heating and pressurizing the recording medium.

2. The image forming apparatus according to claim 1, wherein the flattener is long in a direction perpendicular to the conveying direction of the recording medium, and configured to, in a longer direction thereof, have a center part corresponding to a printable region of the recording medium and two end parts outside the center part, and wherein the adjuster is capable of adjusting the temperature and/or the pressure that the flattener applies to the recording medium and the unevenness of the glue included in the recording medium separately for the center part and for the two end parts.

3. The image forming apparatus according to claim 1, further comprising a detector that detects unevenness in thickness of the recording medium.

4. The image forming apparatus according to claim 3, further comprising a hardware processor that determines based on a result of the detection by the detector whether to flatten the recording medium and the unevenness of the glue included in the recording medium with the flattener.

5. The image forming apparatus according to claim 3, wherein the detector detects an asperity on a surface of the recording medium with a contacting member brought in contact with the surface of the recording medium, thereby detecting the unevenness in the thickness of the recording medium.

6. The image forming apparatus according to claim 3, wherein the detector detects a shade of a surface of the recording medium in a non-contact manner, thereby detecting the unevenness in the thickness of the recording medium.

7. The image forming apparatus according to claim 1, further comprising a hardware processor that obtains density unevenness information on the image formed on the recording medium, and corrects a control value of the flattener based on the obtained density unevenness information.

8. An image forming method comprising:

forming an image on a recording medium, wherein the recording medium includes glue for pasting;

flattening the recording medium and an unevenness of the glue included in the recording medium before an image former forms the image on the recording medium, and adjusting a temperature, a pressure, or both the temperature and the pressure applied to the recording medium and the unevenness of the glue included in the recording medium;

wherein the flattening flattens the recording medium and the unevenness of the glue included in the recording medium by heating and pressurizing the recording medium.

* * * * *